Patented Dec. 6, 1932.

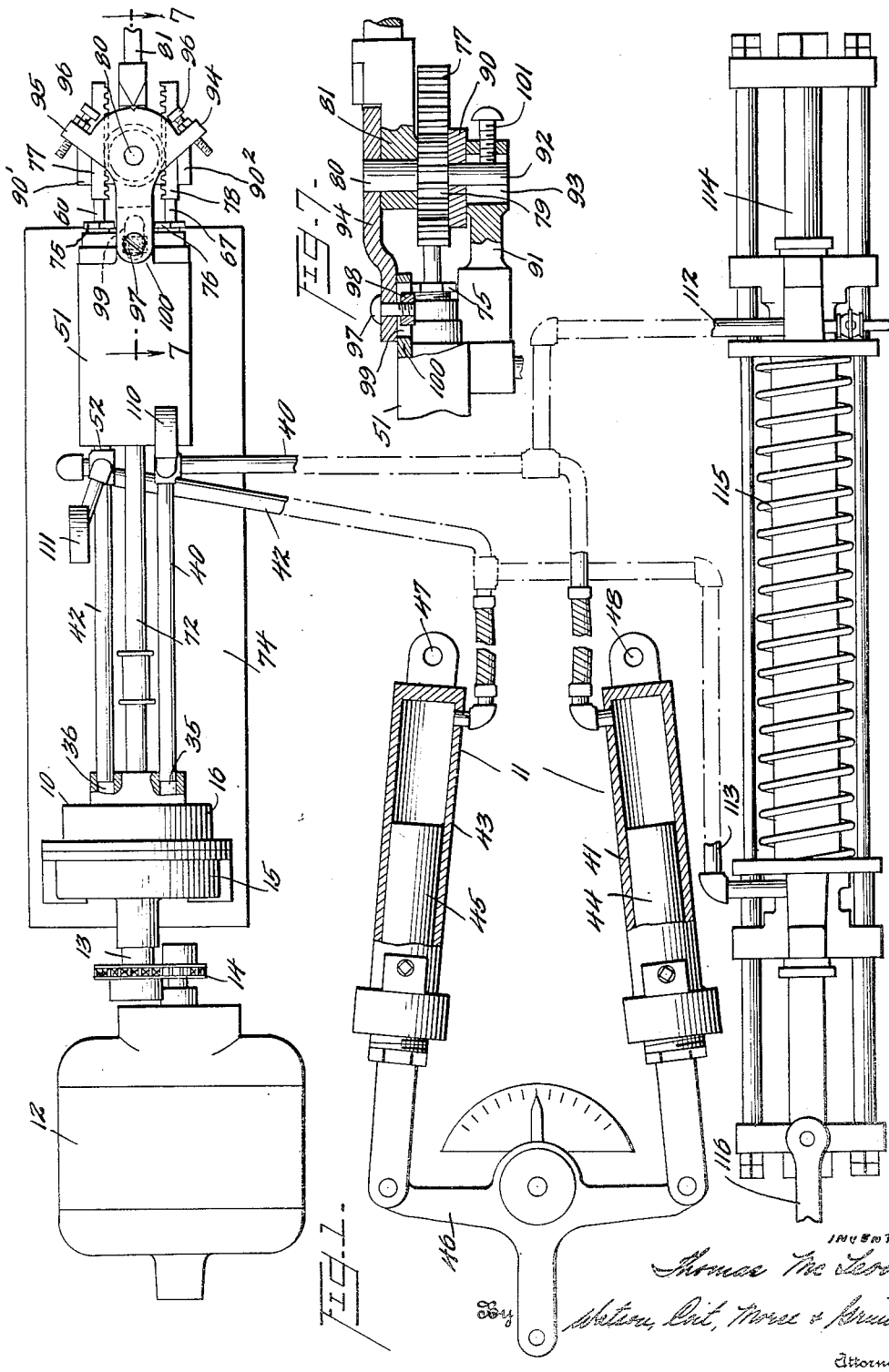

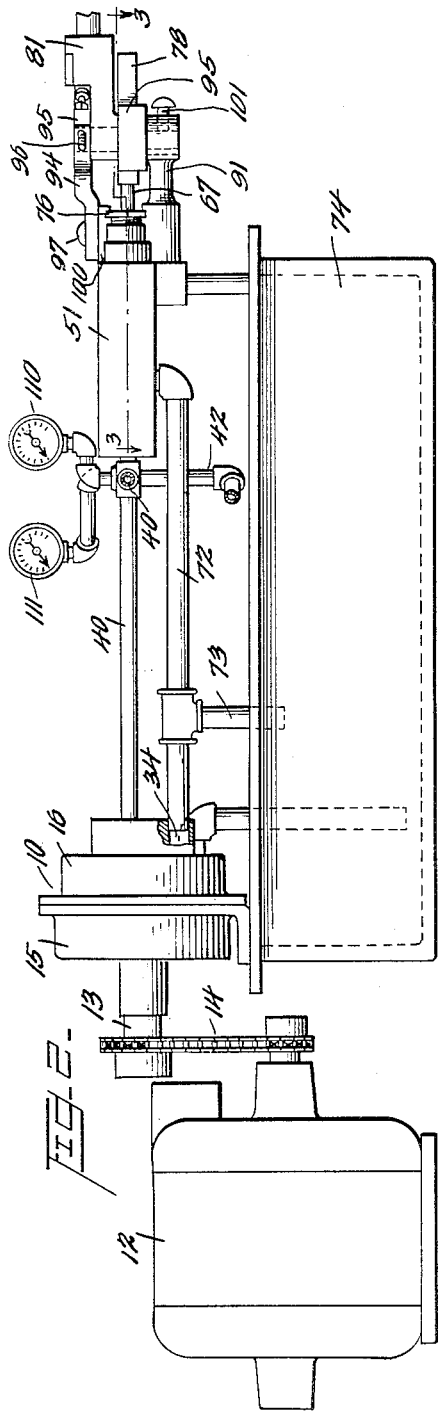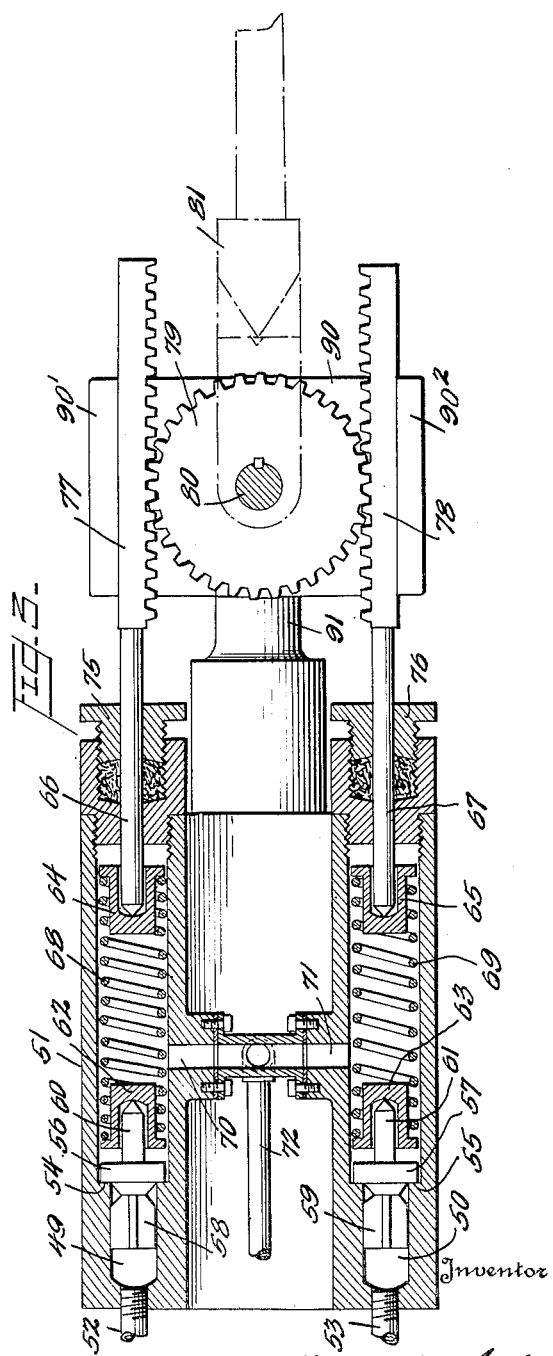

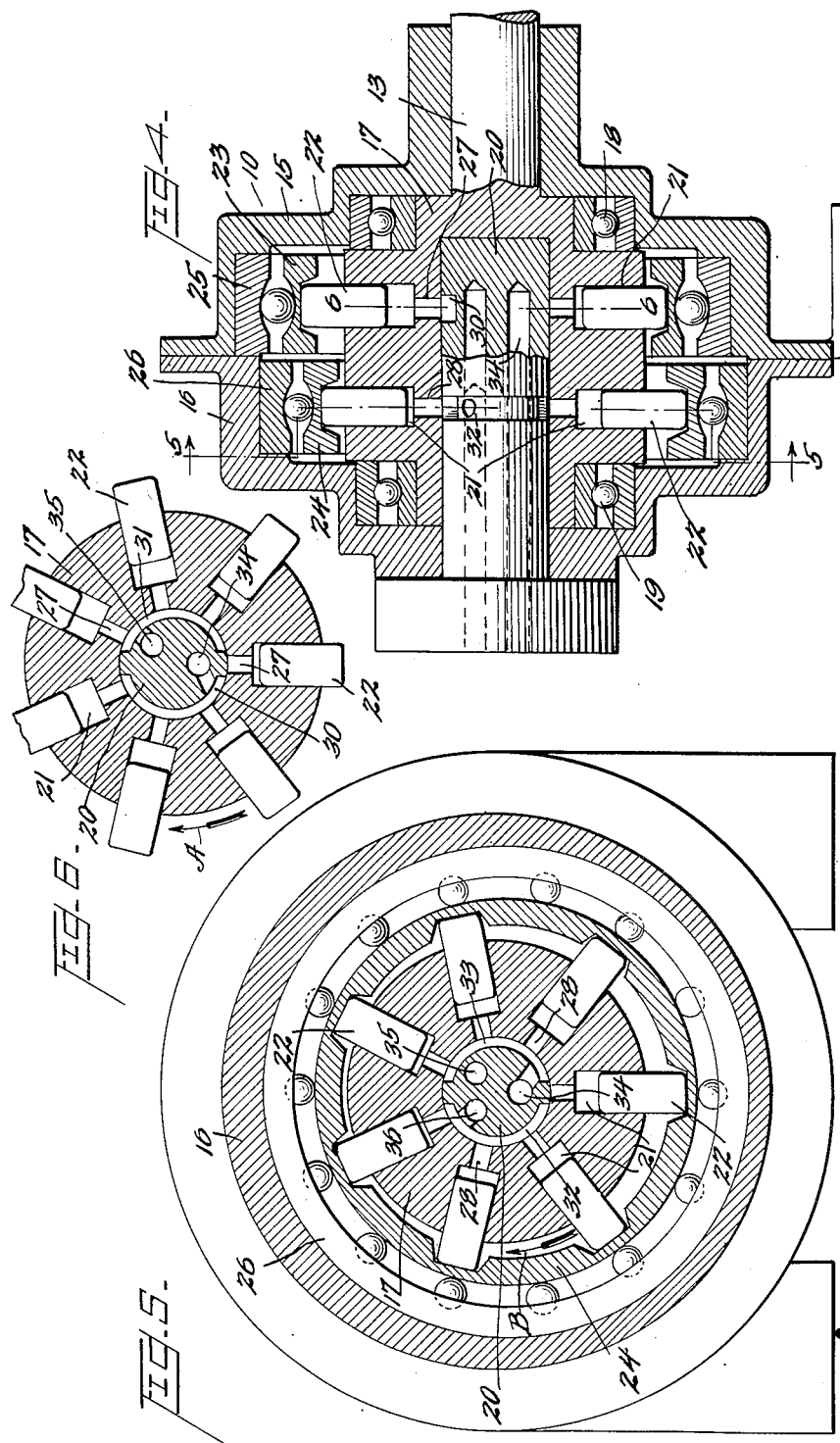

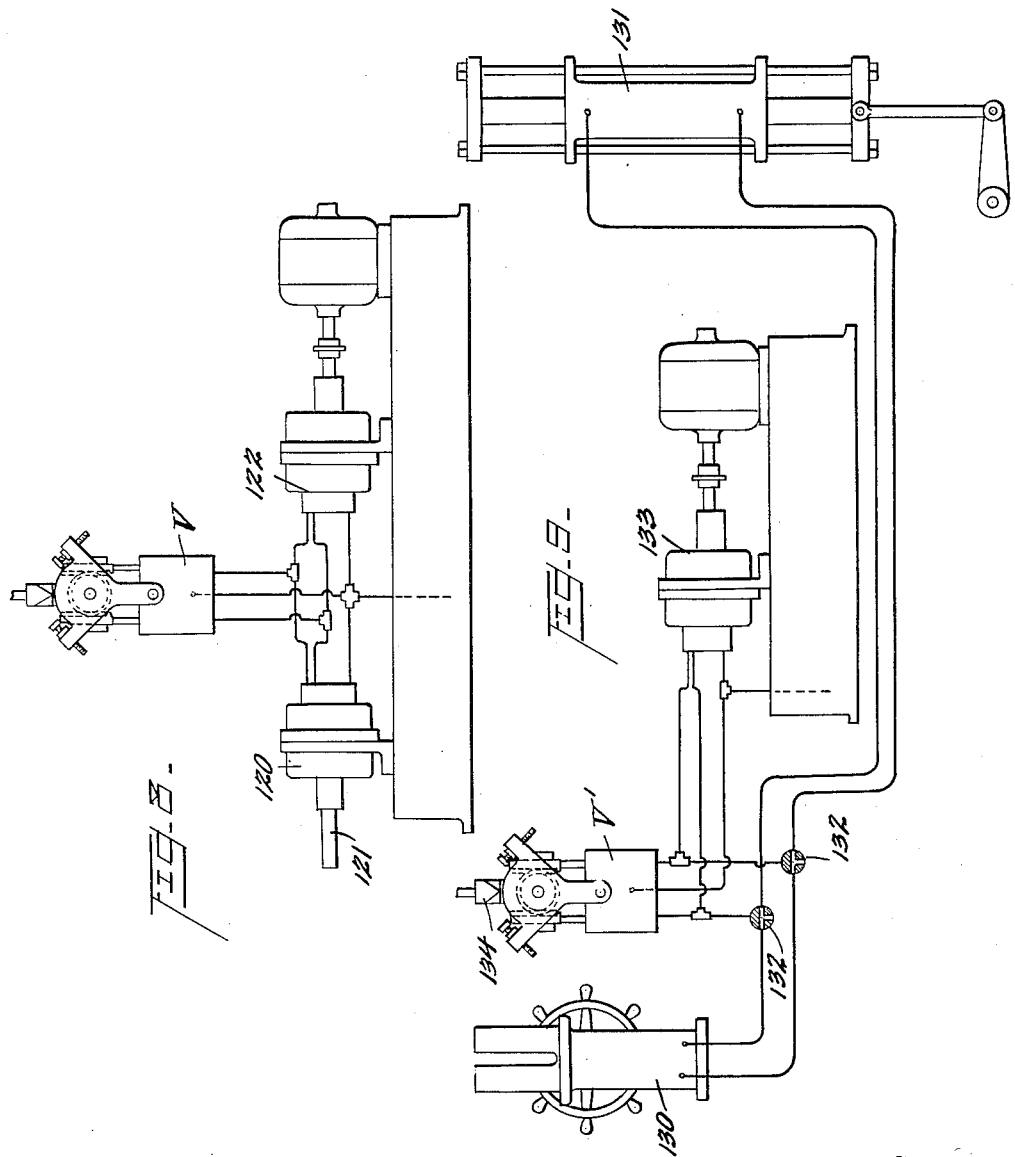

1,890,041

UNITED STATES PATENT OFFICE

THOMAS McLEOD, OF ELIZABETH, NEW JERSEY

STEERING APPARATUS OR THE LIKE

Application filed October 28, 1931. Serial No. 571,637.

The present invention relates to steering apparatus and particularly to power operated steering apparatus of the type used on power driven vessels.

To those experienced in maneuvering power driven ships, the difficulties of maneuvering such ships with known apparatus are well known. With ships of large size, it is almost out of the question to rely upon manual power for operating the steering mechanism. Where mechanically operated and manually controlled steering mechanisms are employed, difficulties are constantly arising and especially the difficulty of maintaining the rudder and the steering wheel or steering handle at all times in desired relationship.

For some time past hydraulic steering mechanisms have come into widespread use, that is, mechanisms by means of which either the rudder or the control valve of a rudder operating engine have been actuated from a distant point, e. g., the bridge or other forward part of a ship, by fluid pressure. Such systems involve extensive fluid transmission lines and the use of plungers, pistons, and the like, and, by reason of the fact that it is almost impossible to prevent a certain amount of leakage from the piping system or past the plungers or pistons, such systems as heretofore known may be said to have the inherent defect that they become out of adjustment after a period of time; that is, the position of the steering element fails to truly indicate the position of the rudder. This naturally is, in a mechanism where precision in operation is requisite to the safety of life and property, a most serious deficiency.

In accordance with the present invention, a hydraulic steering apparatus is provided which may be either substituted for present steering mechanisms now in use or, in some instances, may be applied to existing steering mechanisms, particularly those of the telemetric type, so that the operator may at his option either employ the telemetric transmitter and receiver in the usual manner or may operate the telemetric receiver by the improved hydraulic transmission mechanism to be hereinafter fully disclosed.

By far the greater proportion of hydraulic steering mechanisms now in use involves, in combination with means for placing fluid under pressure, a fluid motor associated either with the rudder or with the telemetric receiver, piping connecting the power source and the motor, and valves which may be manually manipulated and which serve to positively interrupt the flow of fluid to the fluid motor. In addition, such mechanisms have usually included by-pass means whereby a certain amount of fluid may be by-passed to permit movement of the rudder when it is struck by a heavy sea.

My present invention departs from prior practice in that it contemplates the combination with the usual rudder operating motor or telemetric receiver of means for constantly supplying fluid under pressure and direct connections between this means and the rudder motor or telemetric receiver, which connections are never interrupted, so that the source of power is always in communication with the motor to be operated. Each of the conduits connecting the source of fluid under pressure and the motor or receiver is provided with an aperture, and suitable mechanism controls the flow of fluid under pressure from such aperture. Normally this mechanism is so adjusted that the pressure of the liquid in each conduit is such that the contrary forces imparted to the motor thereby are balanced, the motor thus remaining inactive and the rudder or valve operating arm remaining stationary.

By manipulating the mechanism which controls the escape of fluid from the fluid conduits, however, the escape of fluid from one conduit may be retarded, thus increasing the pressure in this conduit and unbalancing the opposed hydraulic forces acting on the motor, the result being that the motor will be operated in one direction and the rudder or steering engine valve lever manipulated. By the mechanism which controls the escape of fluid from the conduits, the pressure in either conduit may be made equal to or greater or less than the pressure in the other so that the fluid motor may be subjected to balanced forces or unbalanced forces, remaining stationary when the forces impressed thereon are balanced but yielding to the superior pressure when the forces are unbalanced.

The fluid motor contemplated by the present invention may vary widely in its design and construction but in general may be said to comprise two hydraulic cylinders and two plungers, the plungers being connected to the object to be operated whether a rudder or a valve operating lever. The mechanism for controlling the escape of fluid from the fluid conduits preferably includes spring-pressed valves which close in a direction contra to the direction of the flow of fluid from the discharge ports. In such case, movement of the rudder under the influence of external forces, for instance as when the rudder is struck by a heavy sea, merely results in temporarily increasing the pressure of the fluid in one of the fluid conduits, and the result of this increase in pressure is that one of the spring-pressed valves is opened somewhat wider than before to permit the outflow of increased quantities of energizing fluid during the time that the rudder is so moving. As soon as the pressure against the rudder is relieved, however, the valve resumes its former position, and the pressures obtaining in the two fluid conduits again become such that the fluid motor is stabilized in the position which it formerly occupied. The invention, therefore, contemplates a novel arrangement of parts, permitting movement of the rudder under the influence of external forces and immediate return of the rudder to original position when the forces are removed.

As a source of fluid power, I preferably employ two fluid pumps, both of which are preferably operated by a single continuously running motor. The fluid employed as an energizing medium is preferably a liquid such as oil, and in the form of the invention disclosed herein by way of example, the pumps are designed to deliver equal amounts of oil at the same rate of flow and under the same pressure. The streams of oil are conducted to the hydraulic motor by conduits of similar length and diameter, and the pressure cylinders and plungers of the hydraulic motor are the same in size and shape. This is a preferred construction, but it will be appreciated that the mechanism need not be so symmetrically arranged should occasion warrant a different design, it being quite possible to provide pumps of different capacities, fluid conduits of different diameters, and an unsymmetrical type of fluid motor without departing from the principles of the invention. The fluid passing through the ports in the fluid conduits is collected and returned to the pump so that there is no wastage. When the motor is not in operation under the influence of the energizing fluid, this fluid merely circulates from the pumps respectively to the discharge ports of the associated conduits and back to the pumps. The discharge ports may be located relatively close to the pumps so that this fluid describes a relatively short path in a closed circuit, thus minimizing the expenditure of power by reducing the frictional losses to the lowest possible amount.

While the invention is of particular utility in connection with steering mechanisms for vessels, in its broader aspects it is not so limited in its use and may be applied to a number of instrumentalities of the industrial arts or wherever it is desired to manipulate a member in two directions by power and under the close control of an operator.

In the drawings:

Figure 1 is a plan view of one form of the apparatus as applied to a steering mechanism having the usual rudder operating hydraulic rams, and in this figure also is indicated in dotted lines an alternative connection by means of which a telemetric receiver of standard type may be operated;

Figure 2 is a side elevation of the motor, hydraulic pump, and control valve mechanism;

Figure 3 is a section on line 3—3 of Figure 2, to a larger scale;

Figure 4 is an axial section through the pumping mechanism;

Figure 5 is a section on line 5—5 of Figure 4;

Figure 6 is a section on line 6—6 of Figure 4;

Figure 7 is a section on line 7—7 of Figure 1, to a somewhat larger scale;

Figure 8 is a side elevation of the mechanism as applied to a hydraulic motor of somewhat different character from that shown in Figure 1; and Figure 9 is a rather diagrammatic view showing the manner of applying the improved mechanism to an existing steering apparatus involving the use of a telemetric transmitter and receiver, the arrangement being such that my improved mechanism may be cut into the steering apparatus as desired.

Referring first to Figure 1 of the drawings, the hydraulic pumping mechanism is indicated generally at 10 and the motor at 11. An electric motor for driving the pump is indicated at 12, this motor being connected to the pump shaft 13 by any suitable driving connection as by means of the chain and sprocket drive indicated at 14. For the motor any other suitable source of power may be substituted where available, and, while this power source need not supply power at an exactly uniform rate, this is to be desired. The pumping mechanism may also be replaced by any other suitable means capable of supplying two streams of fluid under pressure, but that shown in the drawings is eminently satisfactory for the purpose intended.

The details of the pumping mechanism are described and claimed in my previously granted Patent No. 1,358,454, dated November 9, 1920, but the general construction will be understood from an inspection of Figures 4, 5, and 6. In these figures the driving shaft 13 is shown to extend within a casing comprising two casing halves 15 and 16 having meeting flanges rigidly secured together. Shaft 13 is enlarged within the casing to provide the rotor 17, and this rotor is mounted for free rotation within the casing upon ball bearings 18 and 19. Rotor 17 is also axially and cylindrically recessed to receive a stationary cylindrical member 20 in which are formed conduits for the inflow and outflow of fluid. The rotor is provided with two series of cylindrical and radially disposed recesses 21 which comprise cylinders in which correspondingly shaped plungers 22 are adapted to reciprocate in the operation of the pump. The outer ends of these plungers rest against the inner races 23 and 24, respectively, of two ball bearings, and the outer races 25 and 26 fit against the cylindrical inner faces of the casing halves 15 and 16, respectively. It will be observed that the ball bearings are eccentrically disposed with respect to the axis of the rotor, and the two ball bearings have opposed eccentricties.

Pump cylinder inlet and outlet ports are indicated at 27 and 28, each of these ports comprising the means for conducting fluid to its associated cylinder on the intake stroke of the associated piston and conducting fluid away from the cylinder on the compression stroke. As may be seen from an inspection of Figures 5 and 6, the series of ports 27 are adapted to register, as the rotor moves in the direction of the arrow A (Figure 6), successively with two semi-circular slots or grooves formed in the exterior surface of member 20, these grooves being indicated at 30 and 31, respectively. Likewise the series of ports 28 are adapted to register successively with semi-circular grooves 32 and 33. The fluid supply conduit for the pump is indicated at 34, and it will be seen that this conduit communicates with groove 30 of Figure 6 and groove 33 of Figure 5. A fluid discharge conduit for the right-hand pump (Figure 4) is indicated at 35. this conduit being in open communication with groove 31, and the fluid discharge conduit for the left-hand pump is indicated at 36. this conduit being in communication at all times with groove 32.

It is believed that the operation of the pumping mechanism will be rather apparent from the foregoing description. As the rotor of the pump is revolved in the direction of the arrow A (Figure 6) and in the direction of arrow B (Figure 5), the pistons are thrown outwardly against the inner races of the associated ball bearings by centrifugal action, and inasmuch as recesses are provided in these races to receive the ends of the pistons, the races, pistons, and rotor rotate in unison, the pistons being given longitudinal reciprocating movements due to the fact that the ball bearings against which their outer ends rest are eccentrically disposed with respect to the rotor. The net result of this rotary movement is that the series of pistons which is for the time being to the left of a vertical line passing through the axis of member 20 (Figure 6) moves outwardly as the pistons rotate upwardly and withdraw fluid from groove 30. After they pass the vertical, they are forced inwardly and discharge their contents into groove 31, from which groove the liquid makes its way into the discharge port 35.

A similar operation is occurring with respect to the second series of pistons, but the cycle is reversed due to the reversed eccentricity, those pistons to the right of the vertical center line (Figure 5) withdrawing liquid from groove 33 and those to the left forcing liquid into groove 32 and thence into outlet conduit 36. In the operation of the pump, therefor, liquid is sucked in through conduit 34 and is forced out under pressure through the parallel conduits 35 and 36. Due to the reversed eccentricities, the action of the pump is balanced and an even load placed on the electric motor.

Referring now to Figure 1, it will be seen that discharge port 35 is in communication with a conduit 40 which leads to a ram 41 and that discharge port 36 is in communication with a fluid conduit 42 which leads to a ram 43. Rams 41 and 43 are of usual construction, having plungers 44 and 45, respectively, adapted to be reciprocated under the influence of fluid pressure, the ends of these plungers being connected, respectively, to the ends of a rudder cross arm 46. The rams may be pivotally supported at their opposite ends at 47 and 48 so as to be able to swing laterally about these points as the rudder is operated. The discharge ports 35 and 36 of the pump, therefore, are in constant communication respectively with the steering rams.

Intermediate the source of fluid pressure and the rams, however, each conduit is provided with a discharge aperture or port. These ports may be located at various points and may be of widely different types and, in the form shown, are indicated at 49 and 50, respectively, comprising specifically chambers in a valve mechanism generally indicated at 51. A short tubular conduit 52 brings chamber 49 into communication with conduit 42, and a similar conduit 53 brings chamber 50 into communication with conduit 40. Chambers 49 and 50 are essentially cylindrical and are shouldered at 54 and 55, respectively, these shoulders comprising annular seating surfaces for valves 56 and 57. These valves, which are disk-like, are provided with guiding portions 58 and 59 having cylindrical edges which slidably engage the walls of chambers 49 and 50 and are also provided with axial extensions 60 and 61 which project within suitable recesses in cylindrical spring abutments 62 and 63.

At the opposite ends of chambers 49 and 50, respectively, are similar spring abutments 64 and 65 provided with recesses to receive actuating rods 66 and 67, and positioned intermediate the respective sets of abutments are the coiled compression springs 68 and 69, respectively, each of which serves to exert a pressure on the associated valve tending to maintain it in seated position. Chambers 49 and 50 communicate through ports 70 and 71 with a return conduit 72 which leads to the pump intake conduit 34, pipe or conduit 72 having a branch 73 which leads downwardly into the oil chamber or reservoir 74.

Actuating rods 66 and 67 extend outwardly through suitable packing glands 75 and 76, and their outer ends are provided with racks 77 and 78 which mesh with a gear 79 fixed on a short shaft 80. Also fixed on this shaft is a handle member 81 by means of which gear 79 may be given a limited rotatory movement in either direction about its axis. Rotation of the gear in one direction effects increased compression of one of the compression springs 68 or 69 and decreased compression of the opposite spring, or, in other words, causes one of the valves 56 or 57 to be more strongly urged toward its associated seat and the other valve to be more weakly urged toward its seat.

In the normal operation of the mechanism just described, the motor and pump are driven at uniform speed, and the pump delivers parallel streams of fluid through the lines 40 and 42 to the associated rams so that each piston 45 and 46, which pistons are in this instance of the same diameter, is subjected to the same pressure. As the pistons work against each other through the cross arm 46, no unbalanced force is exerted on the cross arm, and no movement of the rudder occurs. The oil streams delivered by the pump displace the valves 56 and 57 a sufficient distance to permit the oil passing by these valves and into the return pipe 72, through which it is returned to the pump. The apparatus will operate indefinitely in this position, no movement of the rudder being effected.

Should it be desired to turn the rudder in one direction, however, the operating lever 81 will be given the appropriate movement, thus causing simultaneous reciprocation of the actuating rods 66 and 67, one rod moving to increase the compression of the associated spring and the other to decrease the compression of the spring with which it co-acts. One valve, therefore, offers increased resistance to the escape of liquid, and the other valve offers decreased resistance. As a result, fluid pressure in one ram is increased, and the fluid pressure in the opposite ram is decreased, thus effecting movement of the rudder, and this movement will continue until it is halted by the pressure of the water against the side of the rudder, the pressure gradually increasing until it balances the fluid pressure in the active ram. The equilibrium thus established will be maintained so long as the operator maintains the operating lever 81 in the position to which it has been moved. To bring the rudder back to neutral, it is only necessary to release the operating lever, the springs 68 and 69 automatically performing this function. Reverse actuation of the rudder is effected by reverse movement of the operating lever.

Should an extraneous force be imparted to the rudder, as, for instance, the striking of a heavy sea against the rudder, the pressure in one of the rams will be considerably increased and also the pressure of the fluid in the line leading back to the associated pump. This increase in pressure, however, does not interrupt the operation of the pump but merely causes the corresponding valve to be unseated to a greater degree to permit the discharge of fluid which makes its escape from the ram cylinder. As soon as this extraneous force ceases to exist, however, the pressures on the two sides of the system immediately become balanced, the operation of the pump remaining unchanged and the action of the springs being the same. The mechanism disclosed, therefore, not only provides means for instantaneous manipulation of the rudder by power but permits any necessary movement of the rudder under the influence of heavy seas without danger of breakage of any part and without the necessity of providing the rather complicated by-pass systems well-known in the art.

In order that the working pressures of the fluid in the system may be controlled or varied at will, means is provided whereby the forces normally exerted upon the valves by the springs may be varied. As will be most clearly observed from Figures 1 and 7 of the drawings, the gear 79, which is keyed to the short vertically disposed arbor 80, is supported upon a plate 90 which in turn slidably rests upon a stationary bracket 91. A reduced extension 92 of arbor 80 projects downwardly through an aperture in plate 90 and into a slot 93 formed in bracket 91. The lateral edges of plate 90 are flanged at $90'$ and $90^2$ to provide lateral supports for the racks 77 and 78. The upper end of arbor 80 is rotatably received in the cylindrical aperture formed in a stop supporting plate 94, which plate is provided with arms 95 carrying adjustable stops 96 which serve to limit the swinging movements of the operating handle in either direction of rotation. The forwardly extending end of plate 94 is provided with an aperture through which a bolt 97 extends, the lower end of this bolt being threaded into a nut 98 positioned in a slot 99 formed in plate 100. The opposed edges of nut 98 are upwardly and inwardly inclined and fit closely against correspondingly inclined lateral edges of slot 99 so that the nut is retained in this slot while having permissible fore and aft movement. An adjusting screw is shown at 101, and by rotating this screw, pressure may be applied to member 92 so that the entire assembly comprising gear 79, arbor 80, plate 94, handle 81, and the actuating rods 77 and 78 may be advanced to compress the springs 68 and 69. By such movement, therefore, increased pressure may be exerted on the valves and hence increased working pressures obtained in the system, or the reverse adjustment may be effected and the compressions of the springs relieved somewhat so that the working pressures are reduced.

The apparatus is so designed, however, that the pump can never be stalled or rendered inoperative by any adjustment of the springs; that is, the pump is so designed as to be able to deliver fluid under a working pressure which is much greater than is necessary to open the valves against the action of the springs so that the apparatus has a very considerable margin of safety in this respect.

Normally the valves oppose flow through the discharge apertures of the fluid conduits to substantially the same degree so that the pressures in these conduits are equal, the pressures acting on the pistons 44 and 45 are balanced, and the fluid motor 11 is inactive. If the operating arm 81 is moved upwardly (Figure 3), spring 68 will be compressed by actuating rod 66, valve 56 will be further moved toward closed position, and the pressure in ram 43 will be increased. At the same time the pressure of the spring 69 against valve 57 is decreased so that the fluid flow from the opposing ram 41 and the interconnected piping may more freely occur. As a result, the cross arm 46 is rotated in a counter-clockwise direction. Reversal of the movement of the arm effects reversal of movement of the cross arm 46 by decreasing the pressure in ram 43 and increasing the pressure in ram 41.

Fluid pressure indicators are shown at 110 and 111, respectively, the function of these indicators being more to indicate the relative pressures obtaining on the two sides of the system than to obtain the actual pressures. The steersman may, by looking at the indicators as he manipulates the operating handle, form a fairly accurate idea as to the degree of pressure unbalanced between the two sides of the system which will aid him in manipulating the rudder. If desired, a rudder position indicating mechanism may be employed with an indicator adjacent the handle 81 so that the steersman may be at all times apprized of the exact position of the rudder.

The invention is not only applicable to a steering mechanism of the ram type such as disclosed in Figure 1 but may also be conveniently applied to steering mechanisms in which the usual telemetric receiver is employed. Thus, the two delivery ports 35 and 36 of the pump may be connected by pipes such as 112 and 113 to the opposite ends of a telemetric receiver. The details of such telemetric receiver are well-known and need not be specifically set forth. It is probably sufficient to say that it comprises two fluid chambers and plungers therefor and that increase of pressure in one chamber and decrease of pressure in the other causes movement of the plunger rod 114 in one direction, which movement may be reversed at will. The plunger rod 114 is returned to neutral position, when the operating lever 81 is placed in neutral position, by means of a spring 115. A link 116 is indicated at one end of rod 114, and this link is adapted to be connected to the valve operating lever of a steam engine or other device by means of which a rudder may be directly operated. The principle of operation of this mechanism involving the telemetric receiver is, however, identical with the principle of operation of the motor comprising rams 41 and 43.

In Figure 8 of the drawings, a somewhat modified form of apparatus is disclosed in which, instead of the rams heretofore disclosed, a fluid motor 120 of rotary type is employed, this motor having a rotary work shaft 121 which may be operatively connected to any member to be driven in opposite directions. Motor 120 is connected to the constantly operating pump 122 in exactly the same manner as in the case of the form of the invention first described, and the valve operating mechanism generally indicated at V is also identical with the valve operating mechanism described in detail in Figure 1. By this arrangement, rotary instead of reciprocating motion may be given to the part to be operated, but otherwise the principles of operation remain the same.

In Figure 9 a steering mechanism is diagrammatically illustrated. This mechanism includes a telemetric transmitter 130 of known type, a telemetric receiver 131 similar to that shown in Figure 1, and two conduits connecting these two instrumentalities whereby movement of the steering wheel produces, or is supposed to produce, corresponding movements in the receiver. Located along the fluid conduits at any chosen points are three-way valves 132, and it is the function of these valves to cut in or out of the system just described, as desired, the power operated system shown in Figure 1. Thus, with the valves turned in the positions in which they are shown in this figure, the hand-operated telemetric transmitter is connected to the receiver, and steering is effected by hand only.

The valves may be turned, however, as is obvious, so that the telemetric transmitter is cut out and the receiver 131 directly connected to the pump 133. With the valves 132 in this position, steering is effected wholly by hand and by manipulating the handle 134 of the valve mechanism generally indicated at V'. In such instance, the operation of the receiver is the same as that of the mechanism described in connection with Figure 1. Steering may be effected, therefore, by power or by hand, at the will of the operator. Valves 132 may be placed at any points along the fluid transmission lines connecting the receiver and transmitter, and furthermore the valve mechanism may be placed at any remote point selected, i. e., a point remote from the motor and pump 133 and, if desired, close to the transmitter 130. This arrangement of parts is particularly convenient when it is desired to apply the novel power steering mechanism to hand steering mechanisms which have already been installed, as all that is necessary is to effect the connection and install the valves 132.

One advantage of the system resides in the ability of the operator to control the rudder from a remote point by the simple operation of a lever (or hand wheel if desired) and without requiring any mechanical connection between this lever and the pump which supplies the energizing fluid. In systems heretofore designed for the operation of steering mechanisms by hydraulic power derived from constantly running motors, it has generally been thought necessary to use pumps of the variable stroke type. The use of such pumps involves the use of mechanical control means extending from the pump to the operating lever. As such mechanical connections are unwieldy and prone to get out of adjustment, the avoidance of their use is highly desirable. The employment of the mechanism just described makes it unnecessary to have any such connection between operating handle and pump.

Although the mechanism has been disclosed in connection with a steering apparatus, with which it is particularly useful, it will be appreciated that it may be employed to operate other members or elements than telemetric receivers or rudders of ships and in fact has many uses in the industrial arts.

The invention, in any of its applications, is exceptionally durable and proof against breakage by reason of abuse. Thus, it is not possible that the mechanism be injured by the violent movement of the operated element, such as a rudder, under extraneous forces, the valves in the fluid transmission lines being never positively closed and immediately opening wider to permit escape of liquid whenever there is a sudden increase in fluid pressure. These valves, therefore, serve not only as operating valves but as safety or relief valves.

In a steering mechanism equipped with the invention another advantage is realized. The reaction of the water against one side of the rudder balances, when the rudder is to one side of its neutral position, the effort of the fluid motor. If the operating handle is held in fixed position and the speed of the ship decreases, the water pressure against the side of the rudder likewise decreases with the result that the rudder automatically swings outwardly to assume a wider angle with the ship's axis. Should the ship's speed increase, the reverse movement of the rudder occurs. This automatic movement is desirable inasmuch as the ship will require a greater rudder angle at slow speed than it will at greater speed when proceeding along any given course.

The fluid operated motor may be of any selected type so long as it is capable of moving an object to be manipulated under the influence of fluid as an energizing medium. The mechanism may be employed not only to actuate a ship's rudder, but it is equally useful in the operation of doors, guns, turrets, etc.

Having thus described the invention, what is claimed as new and desired to be secured by Letters Patent is:—

1. In a device of the class described, in combination, a constantly available source of fluid under pressure, two fluid motors, a member to be operated in two directions, to which member both fluid motors are connected, separate conduits for leading fluid under pressure from said source to said motors, respectively, each such conduit having a leakage aperture formed therein, and mechanism under the control of an operator for regulating the escape of fluid under pressure from each such aperture and whereby the relative pressures of the fluid in said conduits may be adjusted at will to either balance the efforts of said motors or render the effort of either greater or less than that of the other and thereby effect movement of said member, said mechanism being pressure responsive and permitting the escape of fluid from either conduit should the fluid pressure therein become unduly high by reason of movement of said member under the influence of an extraneous force.

2. In a device of the class described, in combination, a constantly available source of fluid under pressure, two fluid motors, a member to be operated in two directions, to which member both fluid motors are connected, separate conduits for leading fluid under pressure from said source to said motors, respectively, each such conduit having a leakage aperture formed therein, and mechanism under the control of an operator for regulating the escape of fluid under pressure from each such aperture and whereby the relative pressures of the fluid in said conduits may be adjusted at will to either balance the efforts of said motors or render the effort of either greater or less than that of the other and thereby effect movement of said member, said mechanism including two valves, one associated with each aperture, and means for actuating said valves, each valve being mounted so as to move, in approaching its seat, in a direction contra to the direction of fluid flow through the associated fluid escape aperture and being yieldable to permit fluid escape upon the development of an excessive fluid pressure in the associated conduit.

3. In a device of the class described, in combination, a constantly available source of fluid under pressure, two fluid motors, a member to be operated in two directions, to which member both fluid motors are connected, separate conduits for leading fluid under pressure from said source to said motors, respectively, each such conduit having a leakage aperture formed therein, and mechanism under the control of an operator for regulating the escape of fluid under pressure from each such aperture and whereby the relative pressures of the fluid in said conduits may be adjusted at will to either balance the efforts of said motors or render the effort of either greater or less than that of the other and thereby effect movement of said member, said mechanism including two valves, one associated with each aperture, resilient means normally urging each valve toward seated position against the pressure of fluid escaping from said aperture, and means for acting upon said springs to increase or decrease the pressure with which each bears against the corresponding valve, whereby the relative fluid pressures within said conduits and motors may be varied as desired.

4. In a device of the class described, in combination, a constantly available source of fluid under pressure, two fluid motors, a member to be operated in two directions, to which member both fluid motors are connected, separate conduits for leading fluid under pressure from said source to said motors, respectively, each such conduit having a leakage aperture formed therein, and mechanism under the control of an operator for regulating the escape of fluid under pressure from each such aperture and whereby the relative pressures of the fluid in said conduits may be adjusted at will to either balance the efforts of said motors or render the effort of either greater or less than that of the other and thereby effect movement of said member, said mechanism including two valves, one associated with each aperture, a spring associated with each valve and normally urging the valve in a direction contra to the direction of flow of fluid through said aperture to close the same, and means for acting on both of said springs to simultaneously increase the pressure of one against its valve and decrease the pressure of the other, or vice versa.

5. The combination set forth in claim 4 in which the springs are coiled compression springs, the axes of which are parallel, each spring having an abutment at the end thereof opposite the valve, rods disposed coaxially with said springs, corresponding ends of said rods engaging said abutments, the other ends of said rods being provided with mutually facing racks, and a gear intermediate said rods, the teeth of which mesh with said racks, rotation of said gear effecting simultaneous axial movements of said rods in opposite directions.

In testimony whereof I hereunto affix my signature.

THOMAS McLEOD.